United States Patent [19]

Truderung

[11] Patent Number: 4,825,627
[45] Date of Patent: May 2, 1989

[54] LAWN MOWER CUTTING ASSEMBLY

[75] Inventor: Axel U. R. Truderung, Manitoba, Canada

[73] Assignee: Saxel Industries Ltd., Winnipeg, Canada

[21] Appl. No.: 229,559

[22] Filed: Aug. 5, 1988

[30] Foreign Application Priority Data

Jul. 14, 1988 [CA] Canada ................................ 572064

[51] Int. Cl.⁴ ............................................ A01D 34/73
[52] U.S. Cl. ...................................... 56/12.7; 56/295; 30/276
[58] Field of Search ...................... 56/12.7, 295, 17.7, 56/255; 30/276, 330

[56] References Cited

U.S. PATENT DOCUMENTS

| | | | |
|---|---|---|---|
| 3,922,744 | 12/1975 | Doering | 56/16.7 |
| 4,065,913 | 1/1978 | Fisher et al. | 56/295 |
| 4,126,991 | 11/1978 | Goblin et al. | 56/295 |
| 4,190,954 | 3/1980 | Walto | 56/12.7 |
| 4,249,311 | 2/1981 | Iwaga | 56/12.7 |
| 4,301,642 | 11/1981 | Thurber | 56/12.7 |
| 4,356,686 | 11/1982 | Lessig III | 56/12.7 |
| 4,362,007 | 12/1982 | Kennedy et al. | 56/295 |
| 4,382,356 | 5/1983 | Ballas, Sr. et al. | 56/12.7 |
| 4,461,138 | 7/1984 | Whitman | 56/12.7 |

FOREIGN PATENT DOCUMENTS 1079076 6/1980 Canada.
1101226 5/1981 Canada.

Primary Examiner—John Weiss
Attorney, Agent, or Firm—Riches, McKenzie & Herbert

[57] ABSTRACT

A grass cutting assembly for a rotary lawn mower having flexible resilient blades replaceably mounted on a rotor disc. Each elongated blade has an elongated inner end portion and a flat outer cutting portion which is twisted at 90° to a flat mid portion. The lower surface of the rotary disc has a radial blade insertion groove which leads to a blade receiving opening which extends radially through each thicker blade holder portion which projects downwardly along the outer periphery of the disc. Each blade receiving opening has a vertically oriented narrow cylindrical portion adjacent the inner face whereby the blade rotates 90° as it is inserted outwardly to a cutting position wherein the enlarged inner end abuts against the inner face of the blade holder portion, and mid portion is held in a vertical orientation and the outer cutting portion which projects beyond the outer periphery of the disc is held in a horizontal orientation. The flat outer cutting portion is sufficiently rigid to efficiently cut the grass, while the vertically oriented mid portion flexes sufficiently when an obstacle is encountered to prevent serious injury, as well as to prevent block shearing.

13 Claims, 4 Drawing Sheets

LAWN MOWER CUTTING ASSEMBLY

BACKGROUND OF THE INVENTION

This invention relates generally to lawn mowers and more particularly to a safer cutting assembly for mounting on a power mower having a vertical drive shaft.

The dangers of conventional rotary mowers having steel blades are well known. As shown in U.S. Pat. No. 4,065,913 to Fisher et al. which issued Jan. 3, 1978, it is known to overcome some of these problems by providing a mower cutting assembly having a plastic rotary disc. As also shown in Canadian patent no. 1,079,076 to Scanland et al. which issued June 10, 1980, and U.S. Pat. Nos. 4,126,991 to Goblin et al. which issued Nov. 28, 1978 and 4,382,356 to Ballas, Sr. et al. which issued May 10, 1983, it is also known to provide flexible cutting pins to reduce the danger of injury. More recently, Canadian patent no. 1,190,753 shows the use of flat plastic cutting blades extending from a central disc. However, it has been found that all of the prior art cutting assemblies have the disadvantage that they do not adequately balance the need for flexibility of the cutting blades for safety with the need for rigidity of the cutting blades to effectively cut the grass.

It is also known from prior art such as Canadian patent no. 1,101,226 to Hetrick which issued May 19, 1981 and U.S. Pat. No. 4,301,642 to Thurber which issued Nov. 24, 1981 to mount air impeller vanes on top of the disc to create a forceful air flow to blow the cut grass out the side chute of the mower. However, these prior vanes have the disadvantage that they can throw stones or other hard objects out of the side chute at a very dangerous velocity.

SUMMARY OF THE INVENTION

Accordingly, it is an object of the present invention to at least partially overcome the disadvantages of the prior art by providing a cutting assembly for a rotary mower having blades with a vertically oriented flexing portion and a horizontally oriented outer cutting portion.

To this end, in one of its aspects, the invention provides a grass cutting assembly for a rotary mower having a wheeled housing and a vertical drive shaft extending into the housing, the cutting assembly comprising: a rotor having a circular outer periphery and being adapted to be mounted in a horizontal position on the drive shaft, the rotor having a peripheral portion with an inner face and at least one blade receiving opening extending radially therethrough from the inner face to the outer periphery of the rotor, a narrow portion of the blade receiving opening adjacent the inner face having a rectangular shaped cross-section which is substantially greater in height than width, at least one elongated blade formed of resilient flexible material having a flat mid portion extending between an enlarged inner end portion and a flat outer cutting portion, each blade being replaceably mounted on the rotor by axial insertion outward through a respective one of the blade receiving openings in the peripheral portion, the outer cutting portion being twisted at substantially 90° to the mid portion whereby the blade rotates substantially 90° as it is inserted to a cutting position wherein the enlarged inner end portion abuts against the inner face of the peripheral portion of the rotor and the mid portion extends with a substantially vertical orientation through the respective blade receiving opening to maintain the outer cutting portion which projects outwardly beyond the outer periphery of the rotor in a substantially horizontal orientation.

Further objects and advantages of the invention will appear from the following description, taken together with the accompanying drawings.

DETAILED DESCRIPTION OF THE DRAWINGS

Figure 1:
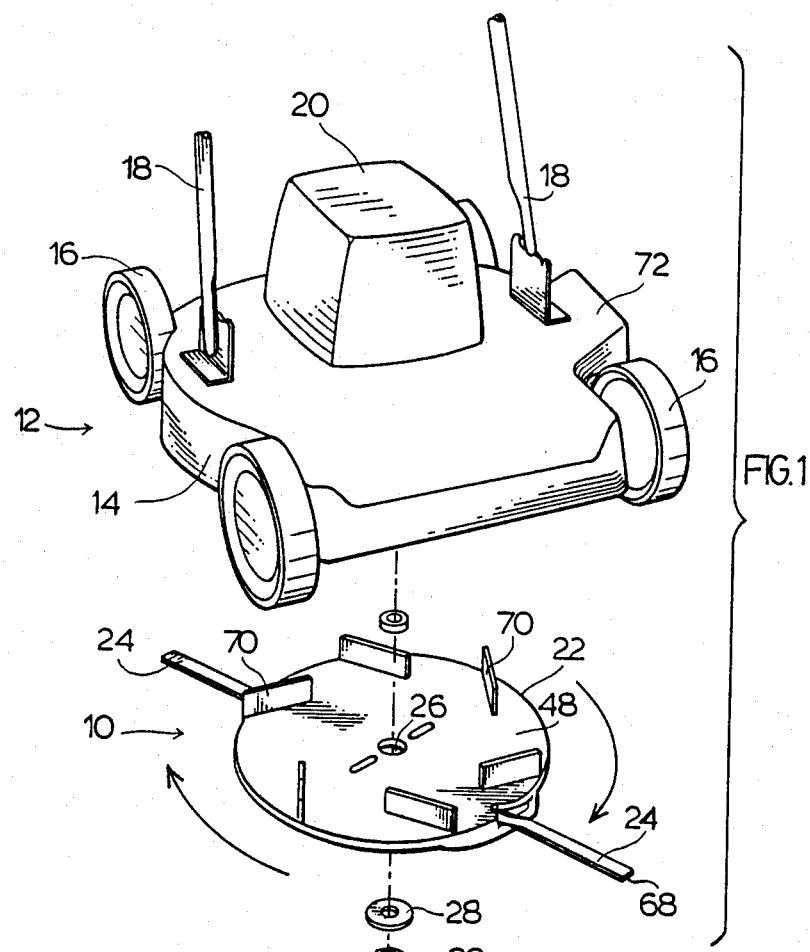
FIG. 1 is an isometric view showing a cutting assembly according to a preferred embodiment of the invention in position for mounting on a lawn mower.
Figure 2:
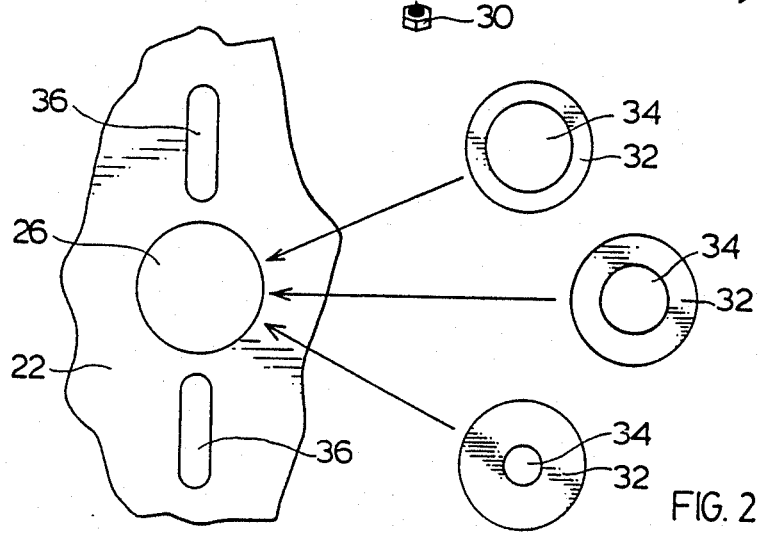
FIG. 2 illustrates different adapters may be used to fit different sized drive shafts.

Reference is first made to FIG. 1 which shows a cutting assembly 10 according to the invention in position for mounting on a conventional lawn mower 12. The mower has a protective housing 14, wheels 16, a handle 18 and a motor 20 which drives a vertical drive shaft (not shown). The cutting assembly according to this preferred embodiment of the invention includes a circular rotor disc 22 and a pair of replaceable flexible blades 24 which project outwardly from the disc 22. The disc 20 has a central hole 26 which receives the dive shaft of the mower 10 to mount it in a horizontal position where it is fastened securely by washer 28 and nut 30. As seen in FIG. 2, rubber adapter rings 32 are provided having different sized openings 34 so the same sized disc 22 can be mounted on mowers having drive shafts of different diameters. Thus, it is apparent that the cutting assembly or cutting blade of many existing lawn mowers can quickly and easily be replaced by a cutting assembly according to the invention. Of course, new mowers incorporating a cutting assembly according to the invention will also be produced. In this embodiment, the rotor disc 22 also has a pair of radial slots 36 which recieve mounting pins (not shown) on some types of mowers.

Figure 8:
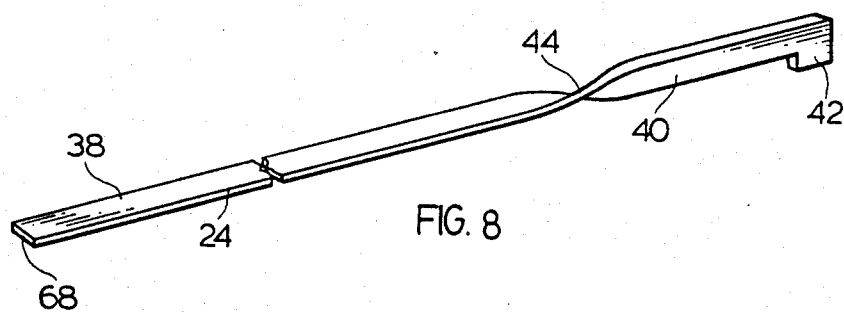
FIG. 8 is an isometric view of the blade.

FIG. 8 shows an elongated blade 24 having a flat outer portion 38 extending from a mid portion 40 with an L-shaped inner end portion 42. The blades 24 are molded of a flexible resilient material with a substantially 90° twist 44 between the outer portion 38 and the mid portion 40. In this embodiment, the blades 24 are molded of DELRON 100 ST NYLON (a trade mark of DuPont) although other suitable materials may also be used. In the embodiment shown, the ratio of the width to the thickness of the outer cutting portion 38 is approximately 4:1 and the mid portion 40 is approximately twice as thick as the outer portion, although these dimensions are illustrative only and will vary for different applications and materials. The width of the outer cutting portion 38 provides a considerable margin for wear and the extra thickness of the mid portion 40 provides additional resiliency during use. The inner end portion 42 or head of the blade 24 can have a variety of other shapes which will hold it in place against centrifugal force when the disc 22 is rotating.

The rotor disc 22 has a circular outer periphery 46, a flat upper surface 48, and a generally flat lower surface 50. However, as seen in FIGS. 3-7 which show the disc 22 in an overturned position, the disc 22 has a pair of blade holder peripheral portion sections 52 which project downward from the lower surface 50 adjacent the periphery 46. Each blade holder section or portion 52 has a leading face 54 which slopes gradually away from the lower surface 50 in the direction of rotation, and an inner face 56 extending vertically downward from the lower surface 50. A blade receiving opening 58 which extends radially through each blade holder portion 52 from the inner face 56 to the outer periphery 46 has a narrow portion 60 adjacent the inner face 56 which has a rectangular cross-section which is substantially greater in height than width to receive the blade 24 with a vertical orientation. As can be seen, the blade receiving opening 58 gradually widens towards the outer periphery 46 of the disc 22 with greater curvature 62 away from the direction of rotation shown by the arrow 64 to allow the mid portion 40 of the blade 24 extending though the opening to flex horizontally when it strikes an obstacle. The lower surface 50 of the disc 22 has a blade insertion groove 66 which is wide enough to receive one of the blades 24 extending radially inward from and in alignment with the blade receiving opening 58 through each blade holder portion 52.

Figure 3:
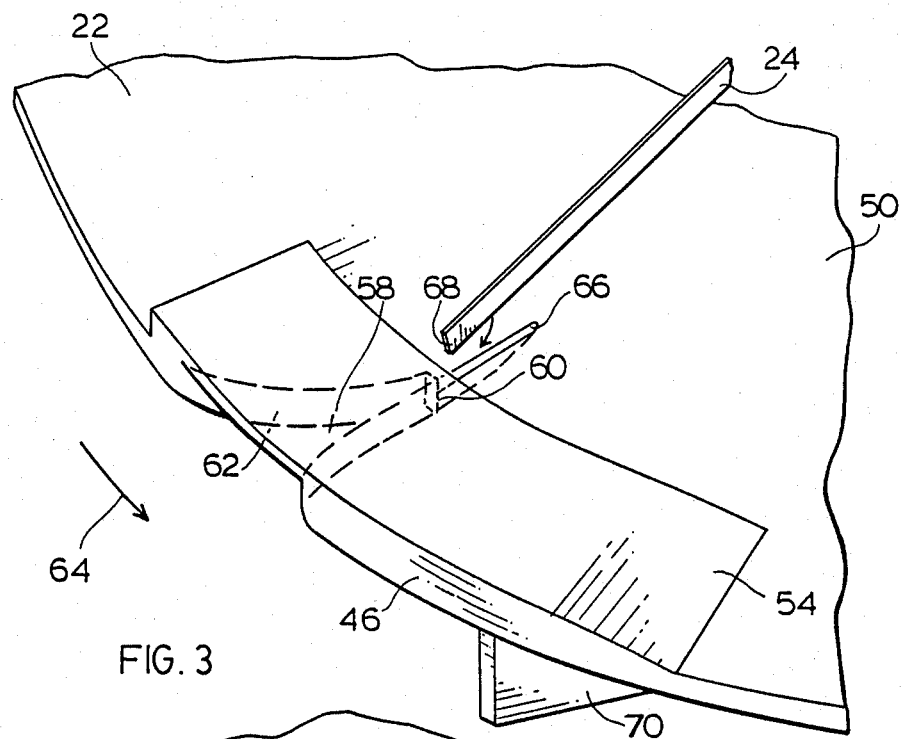
FIGS. 3 and 4 are isometric views showing a portion of the overturned circular disc as a blade is being inserted into the cutting position.
Figure 4:
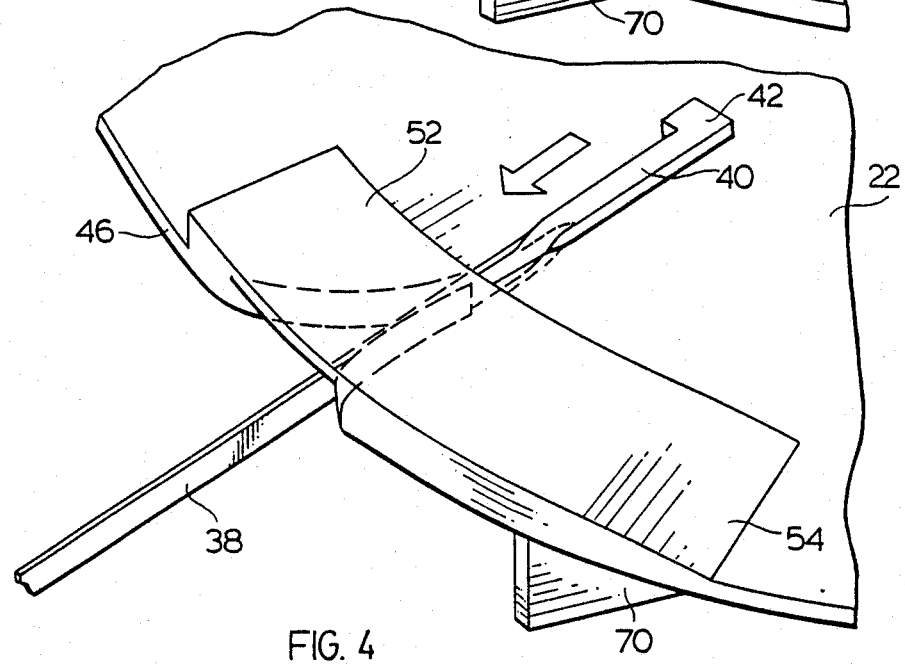
Figure 5:
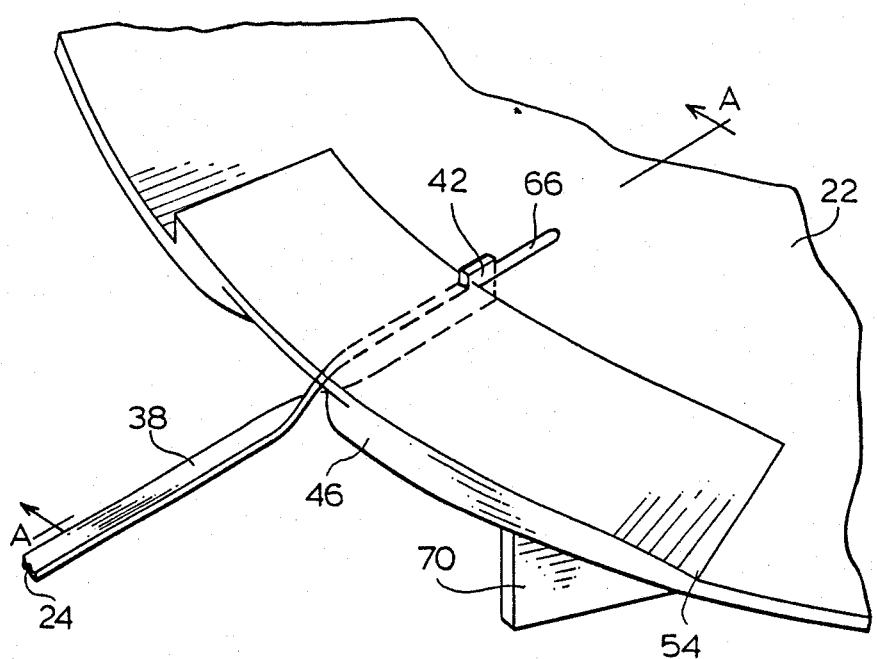
FIG. 5 is a similar view showing the blade fully inserted to the cutting position.
Figure 6:
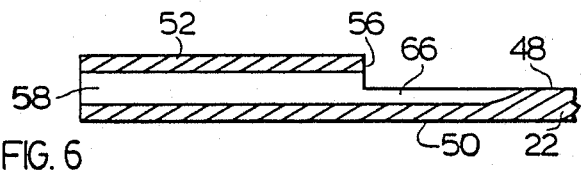
FIG. 6 is a section view taken along line A—A in FIG. 5 with the blade removed.
Figure 7:
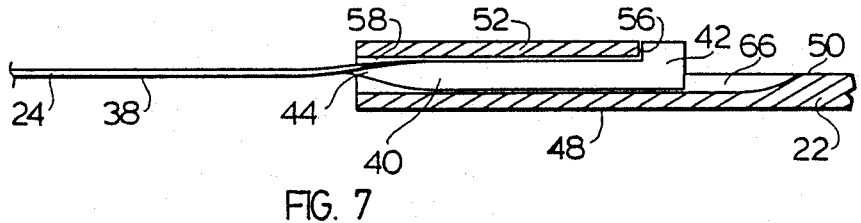
FIG. 7 is a similar view with the blade inserted.
Figure 9:
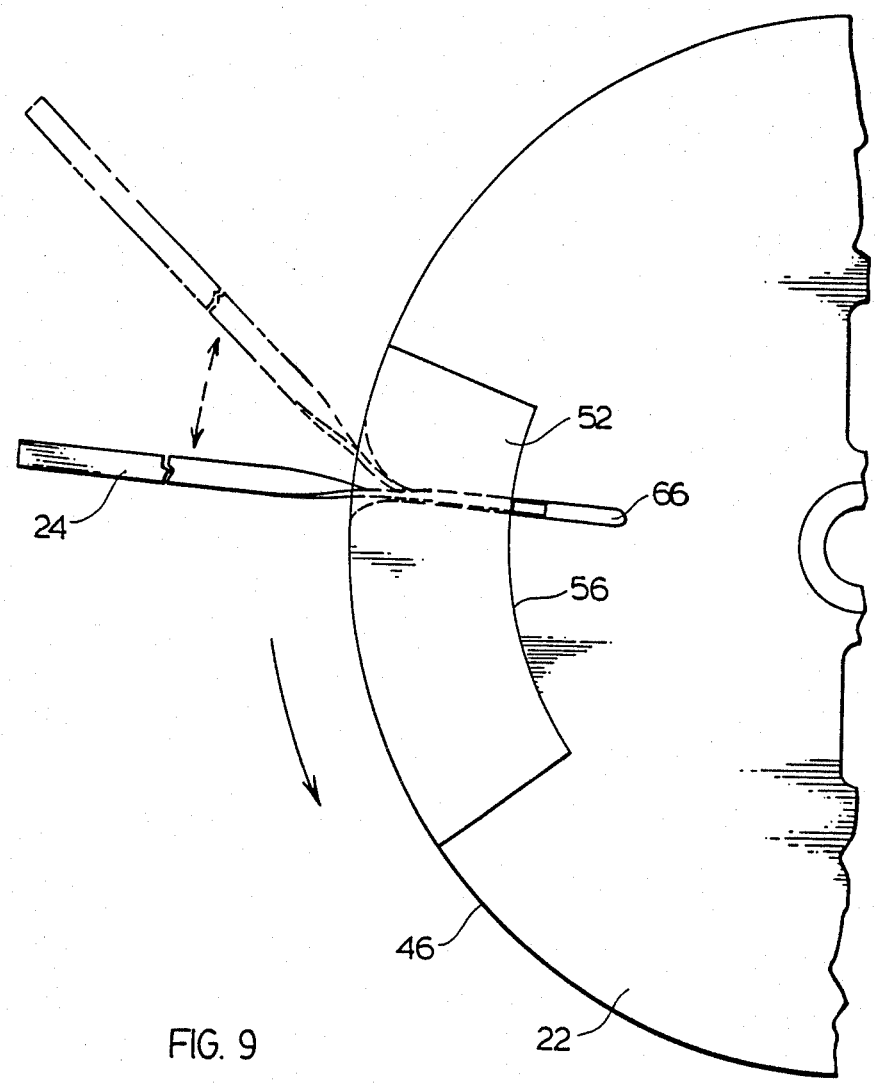
FIG. 9 is a view from beneath the circular disc illustrating how the blade flexes horizontally.

Referring particularly to FIGS. 3-5, each blade 24 is mounted on the disc 22 by manually inserting the outer end 68 with a vertical orientation into one of the insertion grooves 66 and sliding it radially outward through the blade receiving opening 58 through one of the blade holder portions 52. As can be seen, when the horizontally oriented mid portion 40 of the blade 2 encounters the narrow rectangular portion 60 of the opening 58, the blade 24 rotates substantially 90° in the direction of the twist 44. Thus, when the L-shaped inner end portion 42 abuts against the inner face 56 of the blade holder portion 52, the blade 24 is held in a position with the outer cutting portion 38 which projects outwardly beyond the outer periphery 46 of the disc 22 having a substantially horizontal orientation and the mid flexing portion 40 in the blade receiving opening having a substantially vertical orientation. This allows the resilient mid portion 40 to flex horizontally thereby preventing shearing of the blade when it encounters an obstacle, but the outer cutting portion 38 remains essentially rigid to provide the necessary grass cutting action. The mid portion 40 flexes somewhat while cutting grass depending upon the thickness and toughness of the grass. However, as illustrated in FIG. 9, when the outer cutting portion 38 encounters a harder obstacle such as a foot, the mid portion 40 flexes backward sufficiently to avoid serious injury. Also, the flat outer cutting portion 38 being relatively thin and horizontally oriented is self sharpening to a considerable extent by the wearing action of the grass. When the cutting portion 38 of the blade 24 is worn away, the blade is easily replaceable by reversing the above procedure to remove the worn blade and inserting a new one. In this embodiment, the rotor disc 22 is molded of polypropylene with the blade holder portions 52 extending downward from the lower surface 50. While it is possible to reverse this configuration wherein the blades are inserted from the upper surface 48 of the disc 22, this makes blade replacement much less convenient. While the disc 22 can be made of other suitable materials, if it is being used to replace a conventional cutter assembly, it is important that it simulate the weight and size of the original assembly. The NYLON blades 24 are made with the outer cutting portion 38 being sufficiently long that an outer portion can be snapped off with scissors to fit different sizes of mower housing.

Referring again to FIG. 1, it can be seen that the upper surface 48 of the rotor disc 22 has a number of upwardly extending air impeller vanes 70 spaced around the outer periphery 46. These vanes 70 produce a flow of air the disc 22 rotates which carries the cut grass out the side chute 72 of the mower. The vanes 70 are backward swept relative to the direction of rotation of the rotor disc 22 which results in stones o other debris which lands on top of the disc 22 being thrown out the side chute 72 at a very considerable lesser velocity than if they extend radially. This greatly reduces the possibility of injury from a high velocity projectile from the mower. In this embodiment, the vanes 70 are slightly curved away from the direction of rotation and extend at an angle of 35° to the tangent of the disc 22, although other configurations can provide satisfactory results.

While the description of the cutting assembly has been given with respect to a particular embodiment, it is not to be construed in a limiting sense. Variations and modifications will occur to those skilled in the art. For instance, if the disc 22 is made of a suitable material so it is not too heavy, the blade holder portions can extend continuously around the outer periphery 46 of the disc rather than being divided into separate thicker portions 52 as described above. In fact, the disc 22 can have various other configurations which provide a blade holder portion or portions along the outer periphery 46. Reference is made to the attached claims for a definition of the invention.

What is claim is:

1. A grass cutting assembly for a rotary mower having a wheeled housing and a vertical drive shaft extending into the housing, the cutting assembly comprising:
    (a) a rotor having a circular outer periphery and being adapted to be mounted in a horizontal position on the drive shaft, the rotor having a peripheral portion with an inner face and at least one blade receiving opening extending radially therethrough from the inner face to the outer periphery of the rotor, a narrow portion of the blade receiving opening adjacent the inner face having a rectangular shaped cross-section which is substantially greater in height than width,
    (b) at least one elongated blade formed of resilient flexible material having a flat mid portion extending between an enlarged inner end portion and a flat outer cutting portion, each blade being replaceably mounted on the rotor by axial insertion outward through a respective one of the blade receiving openings in the peripheral portion, the outer cutting portion being twisted at substantially 90° to the mid portion whereby the blade rotates substantially 90° as it is inserted to a cutting position wherein the enlarged inner end portion abuts against the inner face of the peripheral portion of the rotor and the mid portion extends with a substantially vertical orientation through the respective blade receiving opening to maintain the outer cutting portion which projects outwardly beyond the outer periphery of the rotor in a substantially horizontal orientation.

2. An assembly as claimed in claim 1 wherein each blade receiving opening through the peripheral portion of the rotor gradually widens towards the outer periphery of the rotor to allow the mid portion of the blade extending therethrough to flex horizontally.

3. An assembly as claimed in claim 2 wherein the rotor is a circular disc having an upper surface and a lower surface with the peripheral portion being a thicker portion of the disc which projects either upwardly from the upper surface or downwardly from the lower surface, the upper or lower surface of the disc having at least one blade insertion groove extending radially inward from and in alignment with each blade receiving opening through the peripheral portion.

4. An assembly as claimed in claim 3 wherein the peripheral portion is discontinuous having a plurality of separate sections, each section having one of the blade receiving openings extending radially therethrough, each section having a leading face which slopes gradually away from the respective upper or lower surface of the disc.

5. An assembly as claimed in claim 4 wherein the inner end portion of each blade is L-shaped and projects away from the respective groove to engage the inner face of the peripheral portion.

6. An assembly as claimed in claim 4 wherein the mid portion is thicker than he outer cutting portion.

7. An assembly as claimed in claim 4 wherein the width of the outer cutting portion of each blade is greater than twice the thickness.

8. An assembly as claimed in claim 4 wherein the ratio of the width to the thickness of the outer cutting portion of each blade is approximately 4:1.

9. An assembly as claimed in claim 4 wherein each blade is adjustable to a desired length by cutting off an outer part of the outer cutting portion.

10. An assembly as claimed in claim 5 wherein the blades are made of NYLON.

11. An assembly as claimed in claim 4 wherein the disc is formed of polypropylene.

12. An assembly as claimed in claim 3 wherein the disc has a plurality of spaced backward swept impeller vanes extending upwardly from the upper surface adjacent the outer periphery.

13. An assembly as claimed in claim 5 wherein each impeller vane is slightly curved away from the direction of rotation.

* * * * *